(12) United States Patent
Wu

(10) Patent No.: US 6,563,090 B1
(45) Date of Patent: May 13, 2003

(54) ELECTRIC HEATING BLANKET CONTROL CIRCUIT ASSEMBLY

(76) Inventor: Shu Chih Wu, 6F, No. 405, Chung Shan Road, Sec. 2, Chung Ho, Taipei Hsien (TW)

(*) Notice: Subject to any disclaimer, the term of this patent is extended or adjusted under 35 U.S.C. 154(b) by 0 days.

(21) Appl. No.: 10/170,929

(22) Filed: Jun. 12, 2002

(51) Int. Cl.[7] ............................... H05B 1/02
(52) U.S. Cl. .................. 219/481; 219/501; 219/497; 219/212; 323/237
(58) Field of Search ................. 219/212, 481, 219/497, 506, 501; 323/319, 235, 236, 237

(56) References Cited

U.S. PATENT DOCUMENTS

| | | | | |
|---|---|---|---|---|
| 4,340,807 A | * | 7/1982 | Raskin et al. ............... | 219/497 |
| 4,346,286 A | * | 8/1982 | Romp ......................... | 219/501 |
| 5,105,067 A | * | 4/1992 | Brekkestran et al. ....... | 219/497 |
| 5,611,952 A | * | 3/1997 | Jones ......................... | 219/505 |
| 5,862,030 A | * | 1/1999 | Watkins, Jr. et al. ....... | 361/103 |

* cited by examiner

*Primary Examiner*—Mark Paschall
(74) *Attorney, Agent, or Firm*—Pro-Techtor International Services

(57) ABSTRACT

An electric heating blanket control circuit assembly is constructed to include an electric heater, a sensor adapted for detecting the temperature level of the electric heater, a controller, the controller having a monitoring circuit adapted for monitoring normal functioning of the sensor and the electric heater and a main control circuit adapted controlling the operation of the electric heater subject to the detection result of the sensor to keep the temperature of the electric heater to be maintained within a limited range, and a power adapter adapted for providing low voltage DC to the electric heater, the sensor, and the controller for working.

4 Claims, 4 Drawing Sheets

ELECTRIC HEATING BLANKET CONTROL CIRCUIT ASSEMBLY

BACKGROUND OF THE INVENTION

1. Field of the Invention

The present invention relates to an electric heating blanket and, more specifically, to a control circuit assembly for electric heating blanket, which consumes low voltage DC for working, controls the temperature of the electric heating blanket constantly within a limited range, and monitors the functioning of the electric heater.

2. Description of the Related Art

During the cold season or in cold weather areas, it is necessary to prepare stoves, electric heaters, electric heating blankets, and other warn-keeping apparatus for the sick persons, the children, the old persons, and the women. However, using a stove to burn fuel material for producing heat energy and light energy simultaneously produces toxic gas that is harmful to the health and the environment. Therefore, it is more practical to use an electric apparatus for warm-keeping. FIG. 1 illustrates a control circuit assembly for an electric heating blanket according to the prior art. The design of control circuit assembly comprises an electric heater 100 adapted for converting electric energy into heat energy, and a thermostat 200 adapted for regulating temperature. This design of control circuit assembly is functional, however it still has drawbacks as outlined hereinafter.

1. The electric heater 100 is controlled by the thermostat 200 to keep the temperature within a predetermined level. However, it the thermostat 200 fails to function well, the electric heater 100 may keep heating when the temperature surpassed the set value, resulting in a catastrophe.

2. The control circuit assembly has no display means for temperature indication. The user regulates the temperature subject to the sense of touch. It is inconvenient to a disable person to regulate the temperature of the electric heating blanket. In case the electric heater 100 fails, an accident may occur.

3. Because the control circuit assembly consumes AC power supply 300 and the electric heating blanket is to be covered on the user's body, it is dangerous if the electric heating blanket is wetted or the control circuit assembly is short-circuited.

SUMMARY OF THE INVENTION

The present invention has been accomplished to provide an electric heating blanket control circuit assembly, which controls the temperature of the electric heater constantly within a limited range. It is another object of the present invention to provide an electric heating blanket control circuit assembly, which monitors the functioning of the main control circuit and, gives a warning signal when the main control circuit fails. According to one aspect of the present invention, the electric heating blanket control circuit assembly comprises a n electric heater, a sensor adapted for detecting the temperature level of the electric heater, a controller, the controller having a monitoring circuit adapted for monitoring normal functioning of the sensor and the electric heater and a main control circuit adapted controlling the operation of the electric heater subject to the detection result of the sensor to keep the temperature of the electric heater to be maintained within a limited range, and a power adapter adapted for providing low voltage DC to the electric heater, the sensor, and the controller for working. According to another aspect of the present invention, a display is provided and controlled by the controller for temperature and time display.

DETAILED DESCRIPTION OF THE PREFERRED EMBODIMENT

Figure 1:
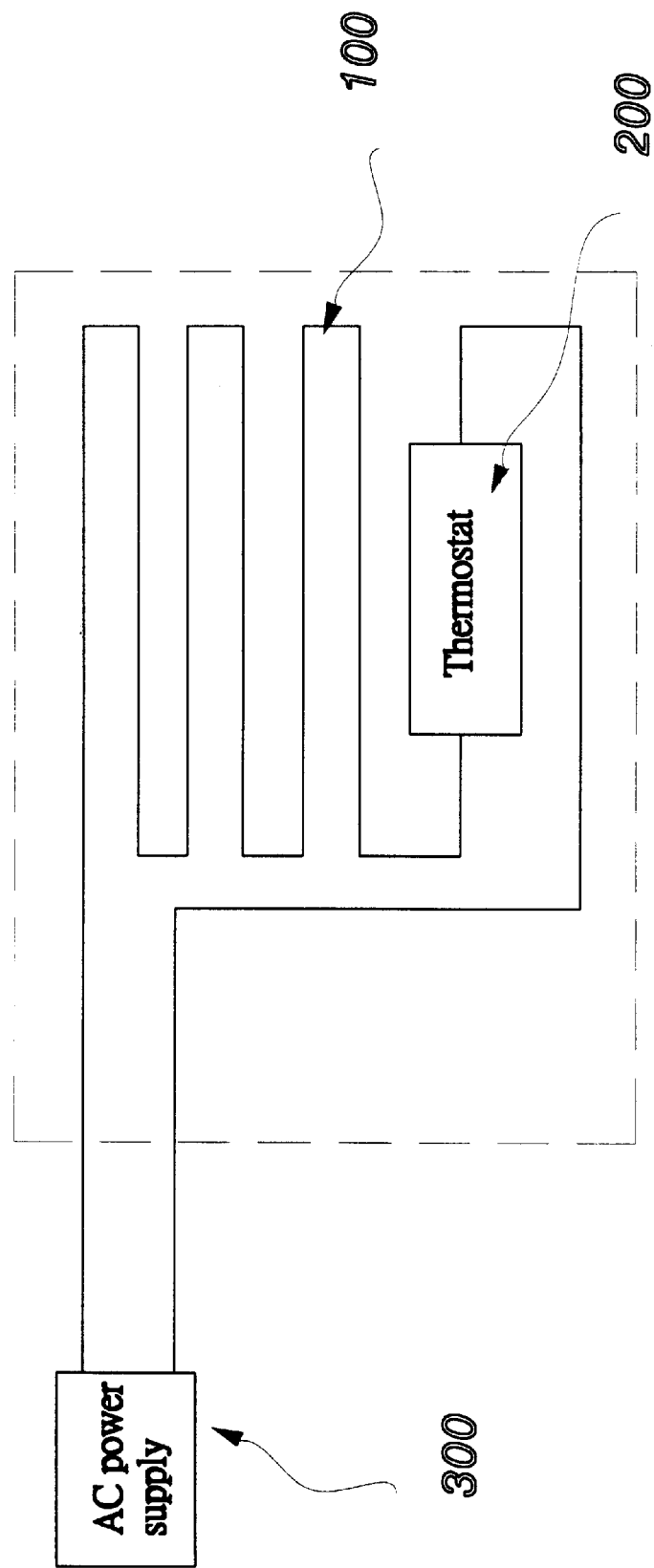
FIG. 1 is a circuit block diagram of an electric heating blanket control circuit assembly according to the prior art.
Figure 2:
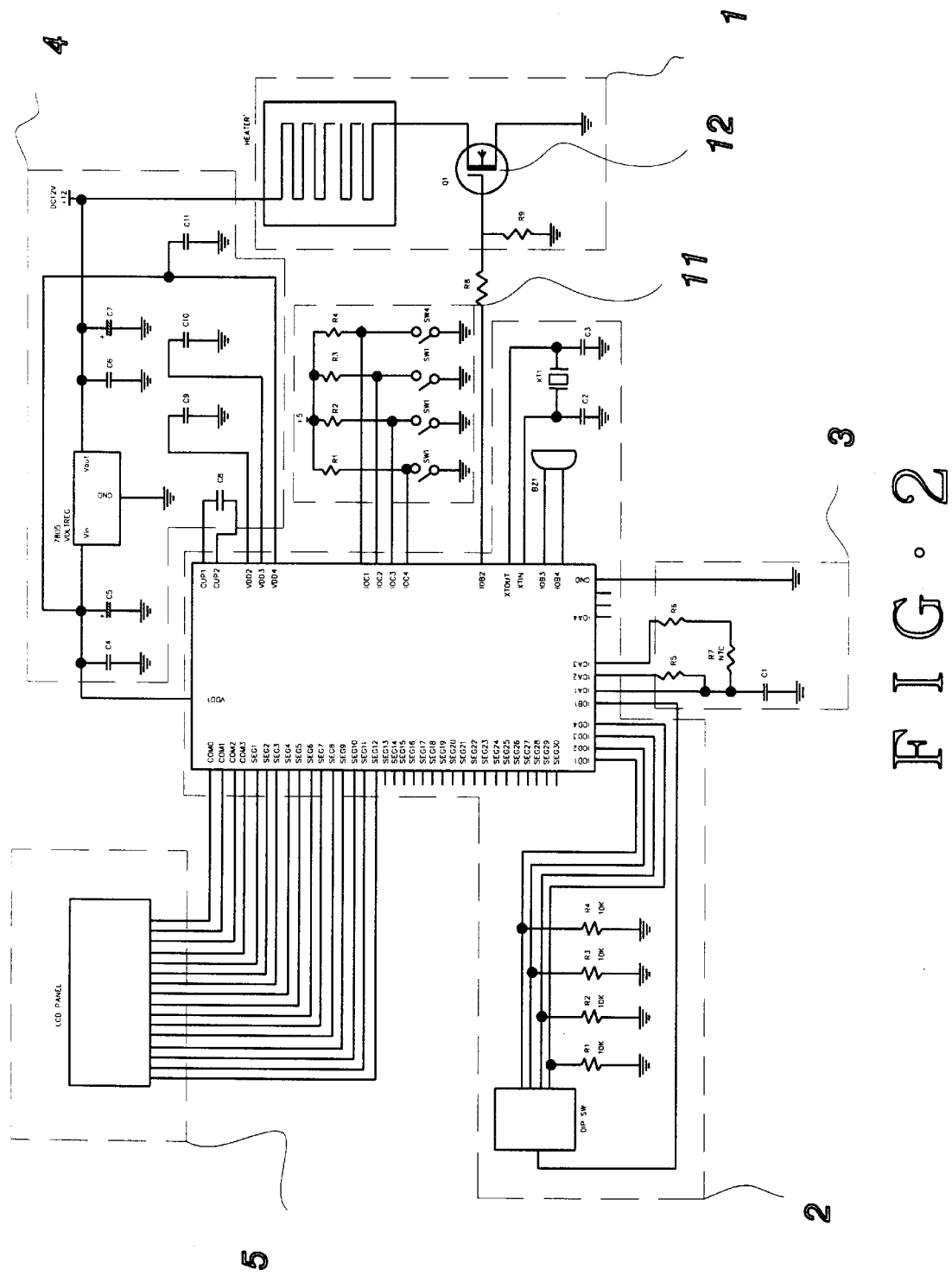
FIG. 2 is a circuit diagram of an electric heating blanket control circuit assembly according to the present invention.
Figure 3:
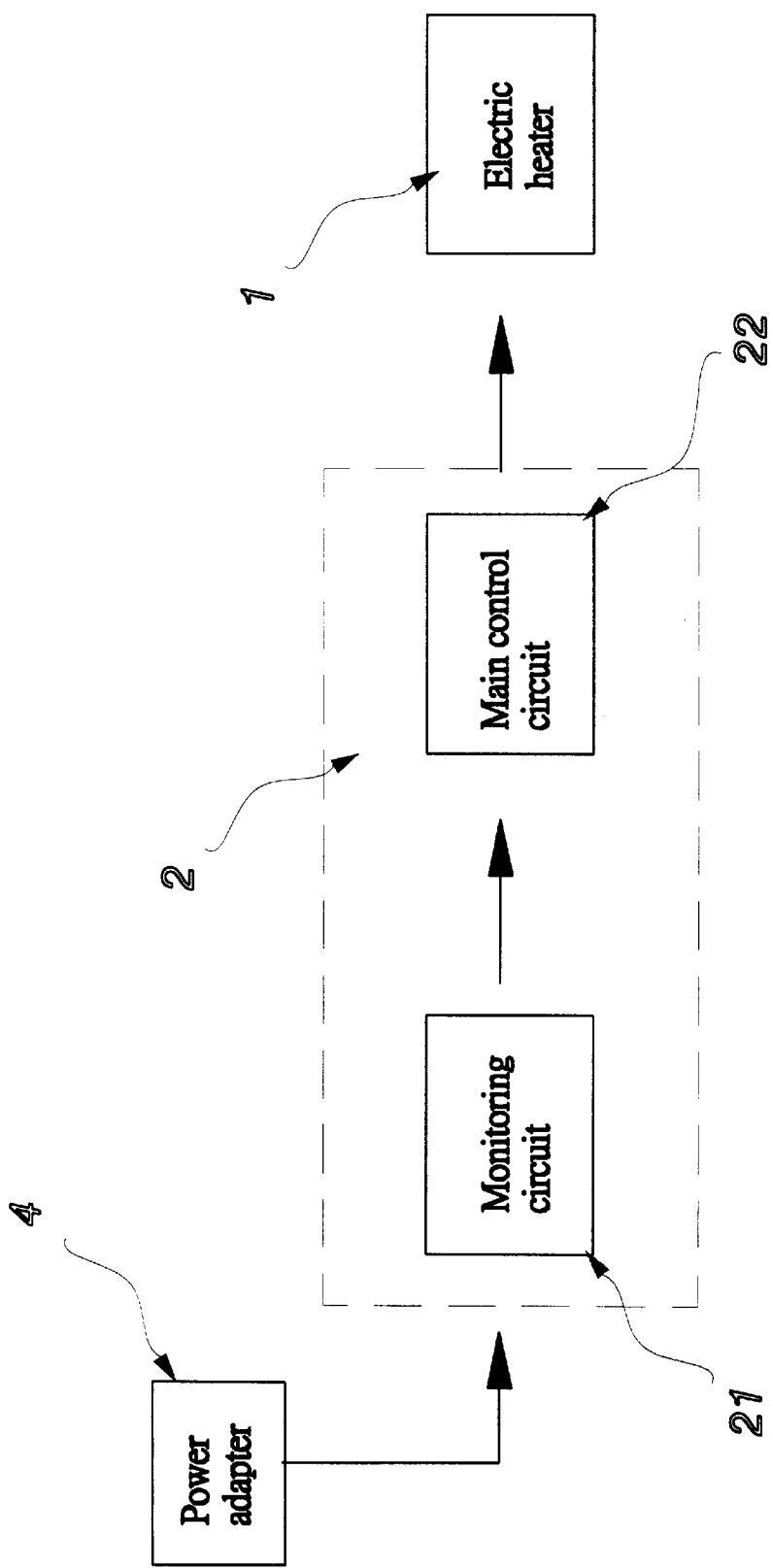
FIG. 3 is a circuit block diagram of the electric heating blanket control circuit assembly according to the present invention.

Referring to FIGS. from 2 through 4, an electric heating blanket control circuit assembly in accordance with the present invention is shown comprising an electric heater 1, a controller 2, a sensor 3, and a power adapter 4. A switch 11 is installed in the electric heating blanket for controlling on/off status of the power adapter 4 and the temperature level of the electric heater 1. The controller 2 is comprised of a monitoring circuit 21 and a main control circuit 22 (see FIG. 3). The controller 2 has one end connected to the power adapter 4, and the other end connected to the electric heater 1. The sensor 3 is electrically connected to the controller 2 and adapted to detect the temperature of the electric heater 1.

When in use, the internal electronic control loop of the controller 2 decides to start the electric heater 1 or not and to regulate the temperature level of the electric heater 1 subject to the temperature value fed back by the sensor 3, keeping the temperature produced by the electric heater 1 to be constantly maintained within a limited range and, saving power consumption and preventing an overload. The monitoring circuit 21 of the controller 2 monitors normal functioning of the system. If the main control circuit 22 fails or the temperature value fed back by the sensor 3 is beyond the set range, it means a malfunction of the system and, the monitoring circuit 21 immediately outputs a warning signal to cut off power supply from the power adapter 4, preventing the occurrence of an accident.

Figure 4:
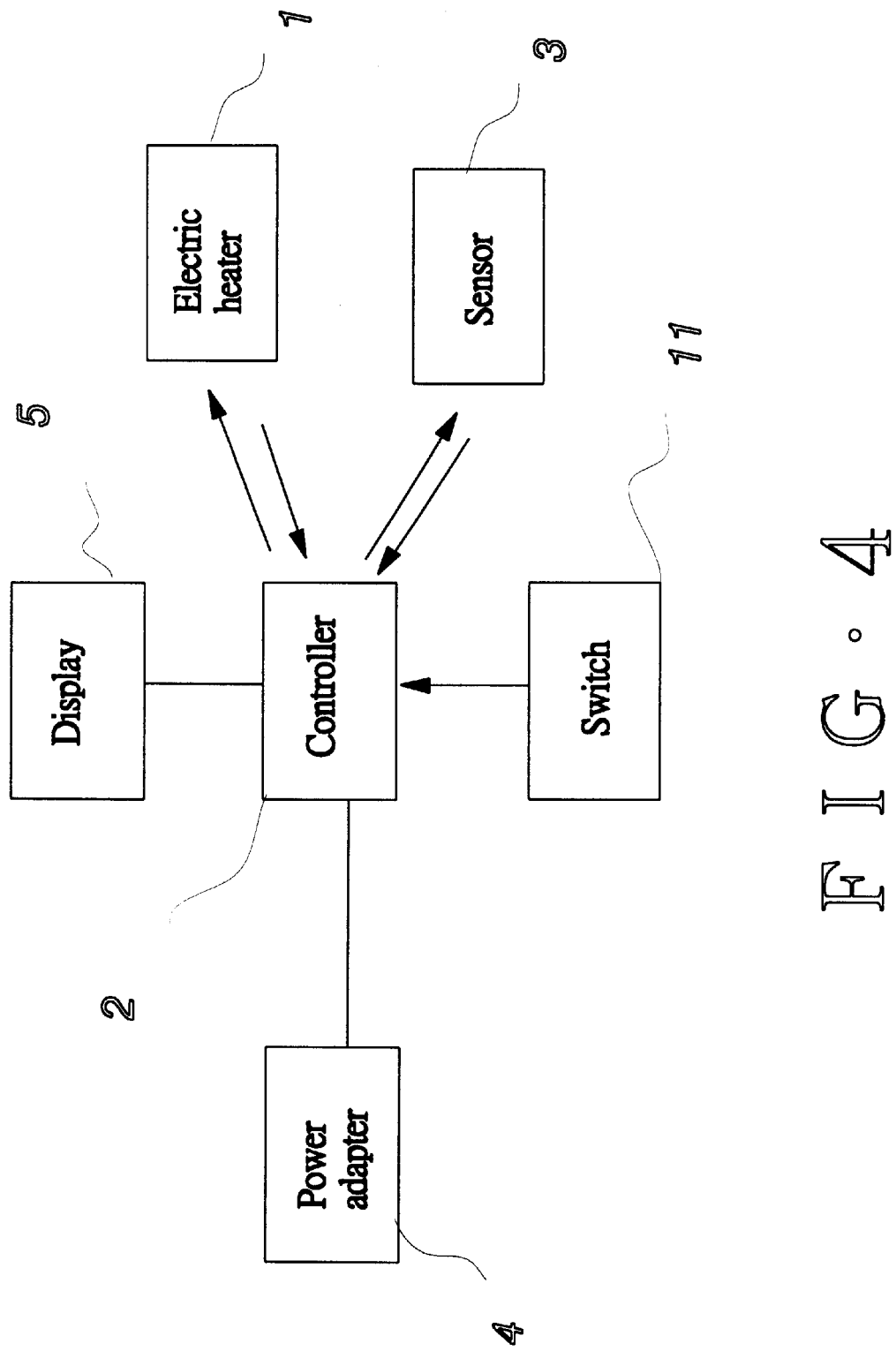
FIG. 4 is a circuit block diagram showing the control circuit assembly installed in an electric heating blanket and connected to a switch and a display according to the present invention.

A display 5 may be connected to the controller 2 (see FIG. 4) for temperature and time display. The power adapter 4 provides low voltage DC for the functioning of the system. Because the control circuit assembly of the electric blanket consumes low voltage DC, the electric blanket is safe in use. Further, through the indications on the display 5, the user can monitor the functioning of the electric blanket.

A prototype of electric heating blanket control circuit assembly has been constructed with the features of FIGS.

2–4. The electric heating blanket control circuit assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electric heating blanket control circuit assembly comprising:

an electric heater adapted for converting electric energy into heat energy;

a sensor adapted for detecting the temperature level of said electric heater and outputting a temperature signal subject to the temperature level of said electric heater;

a controller electrically connected to said electric heater and said sensor, said controller comprising a monitoring circuit and a main control circuit adapted for receiving the temperature signal from said sensor and controlling the operation of said electric heater subject to the nature of the temperature signal received; and a power adapter adapted for providing power supply to said electric heater, said sensor, arid said controller; wherein if a temperature detected by said monitoring circuit is outside a user determined range, said monitoring circuit interrupts power to electric heater.

2. The electric heating blanket control circuit assembly as claimed in claim 1, wherein said main control circuit of said controller comprises an electronic control loop adapted to turn on/off said electric heater subject to the value of the temperature signal received from said sensor, keeping the temperature produced by said electric heater to be constantly maintained within a limited range.

3. The electric heating blanket control circuit assembly as claimed in claim 1, further comprising a display electrically connected to said controller and controlled by said controller for temperature and time display.

4. The electric heating blanket control circuit assembly as claimed in claim 1, wherein said power adapter is adapted to provide low voltage DC to said electric heater, said sensor, and said controller for working.

\* \* \* \* \*